(12) United States Patent
Fecher et al.

(10) Patent No.: US 7,130,300 B2
(45) Date of Patent: Oct. 31, 2006

(54) USE OF PHONE—UART MULTIPLEXER TO CREATE LOW SOFTWARE OVERHEAD EXTERNAL ACCESS TO INTERNAL DATA MODEM WITH WIRELESS COMMUNICATIONS AND PHONE

(75) Inventors: Dana B. Fecher, Farmington Hills, MI (US); Gregory J. Milne, South Lyon, MI (US); Gregory H. Williams, Brighton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 961 days.

(21) Appl. No.: 10/036,922

(22) Filed: Dec. 21, 2001

(65) Prior Publication Data

US 2003/0118055 A1 Jun. 26, 2003

(51) Int. Cl.
*H04L 12/50* (2006.01)
(52) U.S. Cl. ..................................... 370/359
(58) Field of Classification Search ........ 370/357–360, 370/366; 379/32.01, 33, 39; 455/455–457; 709/227, 232
See application file for complete search history.

(56) References Cited

U.S. PATENT DOCUMENTS

| | | | |
|---|---|---|---|
| 3,988,543 A | | 10/1976 | Dall'Olio et al. |
| 5,301,186 A | * | 4/1994 | Galuszka et al. ........... 370/216 |
| 5,680,403 A | | 10/1997 | Riello et al. |
| 5,732,074 A | * | 3/1998 | Spaur et al. ................ 370/313 |
| 5,799,208 A | | 8/1998 | Hwang et al. |
| 6,011,460 A | * | 1/2000 | Flick ...................... 340/426.25 |
| 6,023,232 A | | 2/2000 | Eitzenberger ............... 340/988 |
| 6,061,561 A | | 5/2000 | Alanara et al. |
| 6,133,853 A | * | 10/2000 | Obradovich et al. ........ 340/905 |
| 6,167,255 A | * | 12/2000 | Kennedy et al. ......... 455/414.1 |
| 6,518,855 B1 | | 2/2003 | Gerlach et al. ............. 333/103 |
| 6,526,335 B1 | * | 2/2003 | Treyz et al. ................... 701/1 |
| 6,707,421 B1 | * | 3/2004 | Drury et al. ............. 342/357.1 |
| 6,941,194 B1 | | 9/2005 | Dauner et al. ................. 701/1 |
| 2002/0154605 A1 | * | 10/2002 | Preston et al. .............. 370/254 |
| 2002/0156564 A1 | * | 10/2002 | Preston et al. ................ 701/70 |

OTHER PUBLICATIONS

Mikiya, Emergency accident reporting device with external device communication function. 1999-250378. English translation. pp. 1-12.*
ITU/CCITT-EIA-Bell RS-232, Ionestar.org, pp. 1-4.*
Halsall, Data communications, computer networks and Open systems, Addison-Wesley, 1995, pp. 1, 2, 82 and 83.*

* cited by examiner

*Primary Examiner*—Dmitry Levitan
(74) *Attorney, Agent, or Firm*—Brinks Hofer Gilson & Lione

(57) ABSTRACT

A data processing method includes, at an external computer, originating a ready control signal and, at a host, receiving the ready control signal. In response to the ready control signal, a control signal is produced by the host. In response to the control signal, a switch selectively couples one of the host and the first computer to a telecommunication device.

7 Claims, 3 Drawing Sheets

USE OF PHONE—UART MULTIPLEXER TO CREATE LOW SOFTWARE OVERHEAD EXTERNAL ACCESS TO INTERNAL DATA MODEM WITH WIRELESS COMMUNICATIONS AND PHONE

BACKGROUND OF THE INVENTION

1. Field of the Invention

The present invention relates generally to data processing methods and devices. More particularly, the present invention relates to use of a multiplexer for external computer access to an internal data modem associated with a host computer.

2. Discussion of Related Art

In next generation information systems for vehicles such as automobiles, it is desirable to provide functionality and flexibility for operator convenience and safety. Typical systems will include a host computer to monitor vehicle events including emergency conditions such as air bag deployment or flat tires and provide an indication to an operator of the vehicle. In addition, in a vehicle equipped with a telecommunication device such as a cellular telephone, an emergency communication may be sent to a service provider to provide an alert about an emergency situation for the vehicle. Further, the vehicle may be equipped with a global positioning system (GPS) unit for geographic positioning of the vehicle. Calls may be made to the service provider for directions or other information using position information from the GPS unit.

Another level of operator convenience is provided by including a connection for a detachable computer in the vehicle. For example, a standard connector is provided in the dash or console or other convenient location in the passenger cabin of the vehicle. The operator or a passenger may connect an external computer, such as a laptop computer, to the connector. The connector may in turn be electrically coupled with a cellular telephone to provide remote access for the external computer. In this manner, the system provides access to electronic mail, the internet and other data sources, either directly or through the service provider. Such next generation vehicles will feature multiple communicators accessing a limited number of telecommunication devices.

However, there is a possibility for a conflict between a communication made from the external computer and a host processor which monitors vehicle events. If an emergency communication from the host processor must be made while the external computer is engaged with the cellular telephone, an arbitration between the preexisting communication and the emergency communication must be made. This may be done in the software controlling the host processor and external computer, but that may conflict with other operations of those devices. Further, not all external computers run identical systems so a software solution may not be applicable to all devices externally attached to the system.

Accordingly, there is a need for a method and apparatus for prioritizing access to the telecommunication device among multiple communicators in a vehicle.

BRIEF SUMMARY OF THE INVENTION

By way of introduction only, the present embodiments provide a data processing system which includes an external computer selectively originating a ready control signal, a host processor configured to receive the ready control signal and produce a control signal in response thereto, and a telecommunication device. The system further includes a switch which selectively couples one of the host and the external computer to the telecommunication device in response to the control signal from the host.

The method and system in accordance with the present embodiments provide a hardware interconnection system for a host processor and an external computer, giving both access to a telecommunication device such as a cellular or satellite telephone. When an external computer is connected and operating, the host computer detects this condition and couples the external computer to the telecommunication device through a switch. If the external computer is disconnected, the host detects this and actuates the switch to couple the host to the telecommunication device.

In one embodiment, the host computer has two serial communication ports. One serial port always monitors signals from a cellular phone or other telecommunication device. The other serial port always monitors signals from the external computer. In one exemplary application, for field maintenance a code may be sent from an external computer such as an attached laptop computer to the host computer to actuate a switch and interrupt any telephone call in progress. If an emergency or higher priority condition occurs when the external computer is connected to the telecommunication device and engaged in a call, the host controls the switch to disconnect the external computer and connect the host. In the embodiment illustrated herein, a serial data communication protocol used and at all times the appropriate control signals are provided to the host, the external computer and the telecommunication device so that calls are initiated and terminated normally without abnormal conditions occurring.

DETAILED DESCRIPTION OF THE PRESENTLY PREFERRED EMBODIMENTS

Figure 1:
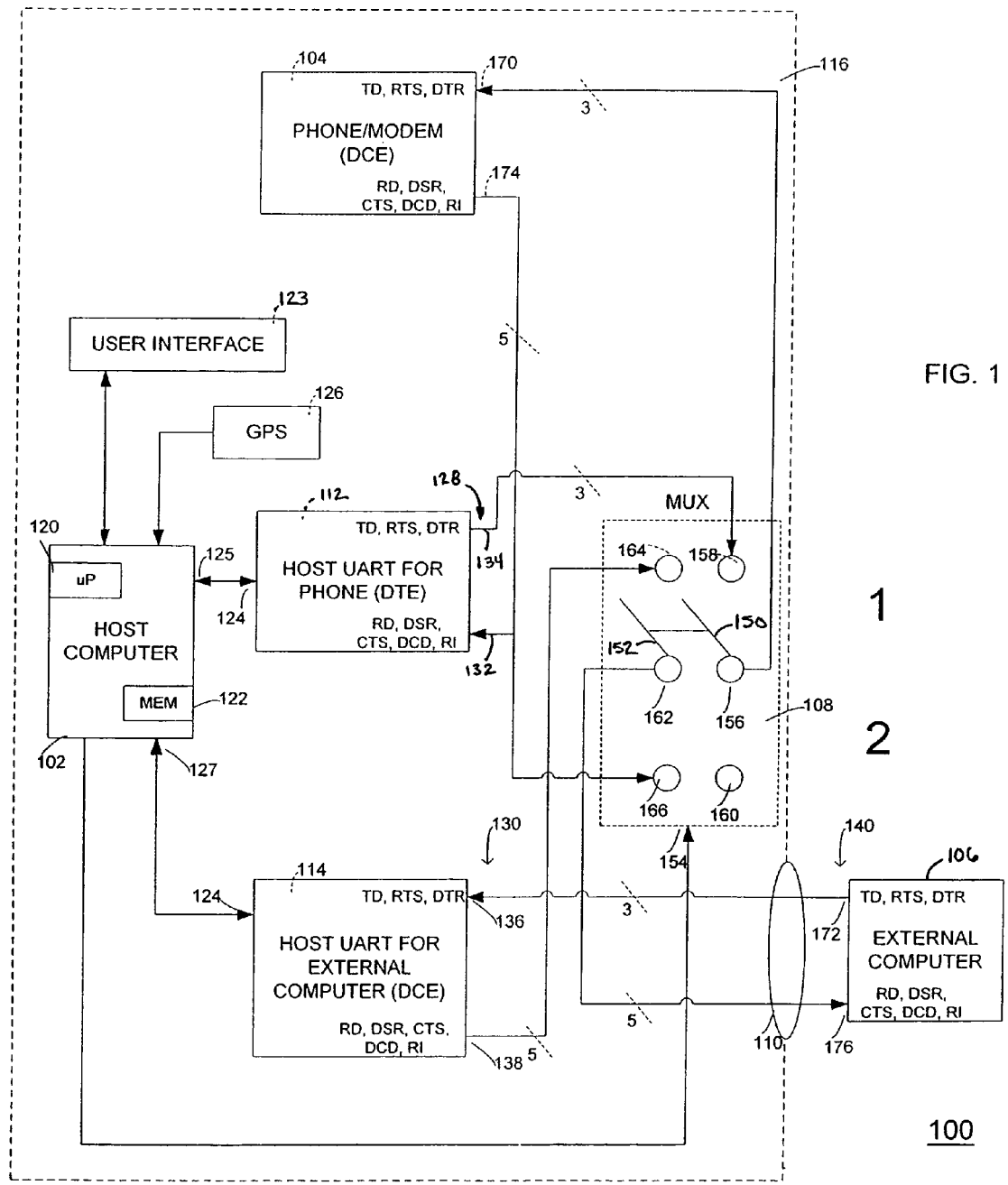
FIG. 1 is a block diagram of an in-vehicle information system.

Referring now to FIG. 1, it shows a block diagram of a data processing system 100. The system 100 includes a host computer 102 (also referred to as a host or host processor), a telecommunication device 104, an external computer 106 and a switch 108. In the illustrated embodiment of FIG. 1, the system 100 further includes a connector 110, a first host universal asynchronous receiver-transmitter (UART) 112 and a second host UART 114.

In the illustrated embodiment, the system 100 is associated with a vehicle 116. It is envisioned that the external computer 106 may be detachably coupled with the rest of the system 100 using the connector 110. In such an embodiment, the vehicle 116 may be an automobile, truck, tractor or other self-propelled vehicle. The vehicle 116 includes the host computer 102 (also referred to as a host) which monitors and controls operating systems of the vehicle 116. Systems controlled or monitored by the system 100 in exemplary embodiments include safety systems including one or more airbags and security systems including the door locks. When an airbag is deployed, the host computer 102 detects the condition. If the doors are unlocked and should be locked because of a received actuation, the host computer 102 locks the doors. Other systems and functions may be under control of the host computer 102 in alternative embodiments.

The host computer 102 may include a processor 120 and memory 122, along with a user interface 123 and a global positioning system (GPS) receiver 126. The processor 120 may be any suitable microprocessor or microcontroller or other general purpose processing apparatus. Alternatively, the processor 120 may be logic circuits interconnected to perform the functions described herein. The processor 120 operates in conjunction with data and instructions stored in the memory 122. The memory 122 may be read only (non-volatile) memory such as flash or other electrically erasable read only memory, read-write (volatile) memory or any other suitable memory circuitry. In one embodiment, the host computer 102 is physically combined with the entertainment radio of the vehicle 116 to provide command and control of in-vehicle data processing systems.

The user interface 123 permits user control of the data processing system 100. In typical embodiments, the user interface 123 includes a display, a keypad, a speaker and a microphone. These and other components of the user interface 123 may be located in or near the dash of the vehicle for ease of use by the user of the data processing system 100 or operator of the vehicle 116.

The GPS receiver 126 receives global positioning signals from satellites in earth orbit and uses the received signals to determine an approximate position for the vehicle 116 on the Earth. Position information is then conveyed to the host computer 102 for use by the host computer 102 or for communication to other receivers.

The telecommunication device 104 forms a vehicle telecommunication device for two-way voice and data communication between the vehicle 116 and a remote telecommunication device. In a typical embodiment, the telecommunication device 104 includes a radiotelephone which permits an operator of the vehicle to initiate and receive voice telephone calls. In the illustrated embodiment, the telecommunication device 104 includes a cellular transceiver. The cellular transceiver includes all hardware and software necessary to provide two-way radio communication with one or more remote radios which is part of a cellular telephone system. The cellular transceiver operates according to a predetermined data communication protocol in conjunction with the remote radios to initiate calls, receive calls and send and receive control information. As a cellular transceiver, the telecommunication device may operate on any suitable cellular telephone standard such as the advanced mobile phone system (AMPS) standard, a time division multiple access (TDMA) standard, a code division multiple access (CDMA) standard or other standards which may be developed.

In an alternative embodiment, the telecommunication device 104 is embodied as a satellite telephone in radio communication with one or more earth orbiting satellites. As a satellite telephone, the telecommunication device operates according to any suitable satellite standard currently existing or developed in the future. In still other embodiments, the telecommunication device 104 may be any radio providing two-way communication of data or audio information.

The telecommunication device 104 of the illustrated embodiment includes a radio portion that operates according to a cellular telephone standard and a wireline portion that operates according to a wireline data communication standard. In one embodiment, the chosen standard is Recommended Standard 232, "Interface Between Data Terminal Equipment and Data Circuit-Terminating Equipment Employing Serial Binary Data Interchange," published by the Electronic Industries Association/Telecommunications Industry Association (EIA/TIA) and commonly referred to as RS-232. RS-232 provides serial data communication over a wireline link between one device, the Data Terminal Equipment ("DTE"), such as the COM1 port of a personal computer (PC) and the Data Communication Equipment ("DCE") such as a modem. In the data processing system 100, the telecommunication device 104 operates as a modem to communicate data between the serial RS-232 wireline portion and the radio portion.

The identification and function of RS-232 signals are standardized. These signals are indicated in FIG. 1 and defined below.

| Signal | Function |
| --- | --- |
| TD | Transmit Data (e.g., from the PC to the modem) |
| RD | Receive Data (e.g., from the modem to the PC) |
| RTS | Request To Send (e.g., PC requests permission to send data to the modem) |
| CTS | Clear To Send (e.g., modem grants permission to send) |
| DSR | Data Set Ready (e.g., modem indicates that it is powered on and operational) |
| DCD | Data Carrier Detect (e.g., the modem is receiving a carrier signal from the remote modem) |
| DTR | Data Terminal Ready (e.g., the PC indicates that it is powered on and operational) |

The RS-232 standard defines voltage levels and signal names. The telecommunication device 104 operates as a modem in an RS-232 network including the host 102 and, when connected, the external computer 106. The connector 110 is connected internally to level shifters which internally translate voltage levels to appropriate RS-232 levels. The level shifters adjust the voltage level and polarity as required. The logical names specified above for the signals do not specify the necessary signals or polarity. The level shifting operation is not explicitly shown in the drawing. The RS-232 levels may be describes as being asserted and negated, or using any other suitable terminology.

The first host UART 112 and the second host UART 114 operate to communicate data between the host computer 102 and the telecommunication device 104 and the external computer 106 according to the RS-232 standard. Each host UART 112, 114 includes a digital interface 124 for communicating digital data with a complementary host digital interface 125 of the host computer 102. The digital data exchanged between these digital interfaces 124, 125 may be multiple-bit parallel data, serial data or have any other suitable format. The host UARTs 112, 114 each further includes a serial interface 128, 130 respectively for communicating a serial stream of data according to the RS-232 standard, or any other information interchange standard that may be chosen for the system 100.

Thus, the first host UART 112 forms a first host serial communication circuit and the second host UART 114 forms a second host serial communication circuit. In one embodiment, the first host UART 112 and the second host UART 114 may be physically integrated with the host computer 102, for example by including the host UARTs 112, 114 on a printed circuit board or integrated circuit included with the host computer 102. In such an embodiment, the first host UART 112 forms a first communication port, the serial interface 128, having an input 132 coupled with the telecommunication device 104 and an output 134. The second host UART 114 forms a second communication port having an input 136 coupled with the connector 110 and an output 138. As indicated in FIG. 1, the respective inputs and outputs may be single bit or multiple bits in width.

The external computer 106 may be any type of data processing apparatus. In the illustrated embodiment, the external computer 106 is a portable data processing device such as a laptop computer or personal digital assistant (PDA) which may be detachably coupled to the vehicle 116 and the data processing system 100 using the connector 110. The external computer 106 in the illustrated embodiment includes a data port 140 including an RS-232 or other modem circuit for communicating data with the data processing system 100.

Many conventional computers, such as personal computers, have a dedicated port referred to as the COM1 port for RS-232 data connection. Other standard or custom circuits may be substituted for the COM1 port. However, by providing for communication between the data processing system 100 and an RS-232 interface such as the COM1 port of a PC, the illustrated embodiment maximizes the number of external devices which may operate with the data processing system 100 while minimizing the modifications that must be made to such a system. It is envisioned that the COM1 port of a PC or other external computer 106 can communicate with the host computer 102 through the connector 110.

In implementations in which RS-232 is the chosen data interchange standard for the system 100, the connector may be a DB-9 connector (standardized by the EIA/TIA in standard EIA/TIA-574) or a DB-25 connector, standardized in EIA/TIA-232). Any other suitable connector may be used. It is envisioned that the connector 110 will be positioned on the dash or console of the vehicle 116 for ready access by a user of the external computer 106. To connect the external computer 106 with the data processing system 100, the user of the external computer 106 plugs a complementary connector into the connector 110, establishing data communication between the external computer 106 and the data processing system 100.

The switch 108 forms a switch circuit which selectively couples one of the host computer 102 and the external computer 106 to the telecommunication device 104 in response to a control signal from the host computer 102. The switch 108 includes a first switch 150 and a second switch 152. The switch 108 receives the control signal from the host 102 at an input 154. In a first position indicated by the number 1 on FIG. 1, the first switch 150 couples a centerpost 156 with a contact 158. In a second position indicated by the number 2 on FIG. 1, the first switch 150 couples the centerpost 156 with a contact 160. Similarly, in the first position, the second switch 152 couples a centerpost 162 with a contact 164. In the second position, the second switch 152 couples the centerpost 162 with a contact 166. Switch position is controlled by the control signal at the input 154.

The switch 108 may be constructed using any suitable components. The switch may be a plurality of physical switches controllable by a control signal at the input 154. Alternatively, the switch 108 may be a plurality of logic elements such as multiplexers controlled by one or more control signals at the input 154. Software implementations may also be devised for controlling the interconnection of the elements of the data processing system 100 as functionally illustrated in FIG. 1 and described herein.

As can be seen in FIG. 1, the centerpost 156 of the first switch 150 is coupled to an input 170 of the telecommunication device 104. The contact 158 is coupled to the output 134 of the first host UART 112. The contact 160 is coupled through the connector 110 to an output 172 of the external computer 106 and to an input 136 of the second host UART 114. The centerpost 162 of the second switch 152 is coupled through the connector 110 to an input 176 of the external computer 106. The contact 164 is coupled to the output 138 of the second host UART 114. The contact 166 is coupled to an output 174 of the telecommunication device 104 and an input 132 of the first host UART 112. As is indicated in FIG. 1, the connections between the switch and the other portions of the data processing system 100 may be one or more bits in width. In the illustrated embodiment, the connections convey the respective RS-232 signals indicated in FIG. 1.

When the host computer 102 provides the control signal at the input 154 to set the switch 108 in the first position, the following connections are established. The output 138 of the second host UART 114 is coupled through the second switch 152 to the connector 110 and the input 176 of the external computer 106. The output 134 of the first host UART 112 is coupled through the first switch 150 to the input 170 of the telecommunication device 104. The output 174 of the telecommunication device 104 is directly coupled to the input 132 of the first host UART 112. The output 140 of the external computer 106 is directly coupled through the connector 110 to the input 136 of the second host UART 114.

When the host computer 102 provides the control signal at the input 154 to set the switch 108 in the second position, the following connections are established. The output 174 of the telecommunication device 104 is coupled through the second switch 152 and the connector 110 to the input 176 of the external computer 106. The output 172 of the external computer 106 is coupled through the connector 110 and the first switch 150 to the input 170 of the telecommunication device 104. The output 174 of the telecommunication device 104 is directly coupled to the input 132 of the first host UART 112. The output 140 of the external computer 106 is directly coupled through the connector 110 to the input 136 of the second host UART 114.

Thus, in the second position of the switch 108, the external computer 106 is connected to the telecommunication device 104 and may initiate or receive calls using the telecommunication device 104. Depending on the capabilities of the external computer 106, a user of the external computer 106 may telephonically engage a wireless service provider to access the internet, check electronic mail or otherwise communicate data using the telecommunication device when the switch 108 is in the second position. Data are transmitted and received from the external computer 106 using RS-232 format. The telecommunication device 104 similarly communicates RS-232 formatted data and converts between RS-232 formatted data and the data format used on the wireless link established by the telecommunication device.

In the first position of the switch 108, the host computer 102 is placed in communication with the telecommunication device 104. In this manner, the host computer 102 may transmit data to the wireless service provider when required. For example, a user of the host computer 102 may request driving directions using the user interface 124. The request is formatted by the host computer 102 and conveyed as RS-232 data to the telecommunication device 104. The telecommunication device 104 converts the RS-232 data to a data format for wireless communication and transmits the request over a radio link. When a response or any other communication is received from a remote radio and intended for the vehicle 116, the response or other communication is converted to RS-232 data and communicated to the host 102.

In the illustrated embodiment, a direct connection is maintained between the output 172 of the external computer 106 and the input 136 of the second host UART 114. The host computer 102 detects the presence of the RS-232 signal DTR from the external computer 106 using this connection. As noted above, the external computer 106 transmits the signal DTR when the external computer is powered up and it is operational. If the data communication circuit of the external computer 106 is not active, the signal DTR will not be asserted or will be transmitted with a logic low value. When the external computer 106 asserts the signal DTR, the host computer 102 in response generates the control signal at the input 154 of the switch 108 to switch the switch to position 2. This connects the external computer 106 to the telecommunication device 104.

Thus, the external computer 106 selectively originates a ready control signal in the form of the DTR signal. The host 102 is configured to receive the ready control signal and produce a control signal, the control signal at the input 154 of the switch 108, in response thereto.

The illustrated embodiment allows the host computer 102 to apply the appropriate control signal at the input 154 to switch the switch 108 to position 1. This switch position connects the telecommunication device 104 to the first host UART 112 and connects the external computer 106 to the second host UART 114. This permits the host computer 102 to resolve a conflict between a communication made from the external computer 106 and the host. If, for example, an emergency situation is detected by the host 102 so that an emergency notification or communication must be made using the telecommunication device 104 while the external computer 106 is engaged in a telephone call using the telecommunication device 104, the host 102 may assert the proper control signal to the switch 108 to disconnect the external computer 106 from the telecommunication device 104. An example of this operation is deployment of the airbag. Under this circumstance, the host computer 102 may be programmed to detect the airbag status and automatically initiate a call using the telecommunication device to a service provider to summon emergency help. If a call is under way from the external computer 106 plugged into the connector 110 to access the telecommunication device 104, the connection between the external computer 106 and the telecommunication device 104 is interrupted as the emergency condition is given a higher priority by switching the switch 108 to position 1.

RS-232 data connections may be maintained as normal in the illustrated embodiment. When the connection between the external computer 106 and the telecommunication device 104 is interrupted by reprogramming the switch 108, the external computer 106 detects signals communicated by the host computer 102. Similarly, the telecommunication device 104 detects the signals communicated by the host computer 102. When the switch 108 is actuated, the host computer 102 controls communication with the telecommunication device 104 and the external computer. This includes communication of data as well as communication of control signals. For example the host computer 102 can negate the signal DCD or data carrier detect to interrupt the connection to the external computer. In this manner, operation of the data transmitting circuitry of the external computer 106, the telecommunication device 104 and the host computer 102 ends abruptly but under control of the necessary control signals. This ensures that no data is lost and that none of the devices enters an undefined state and becomes hung up.

Figure 2:
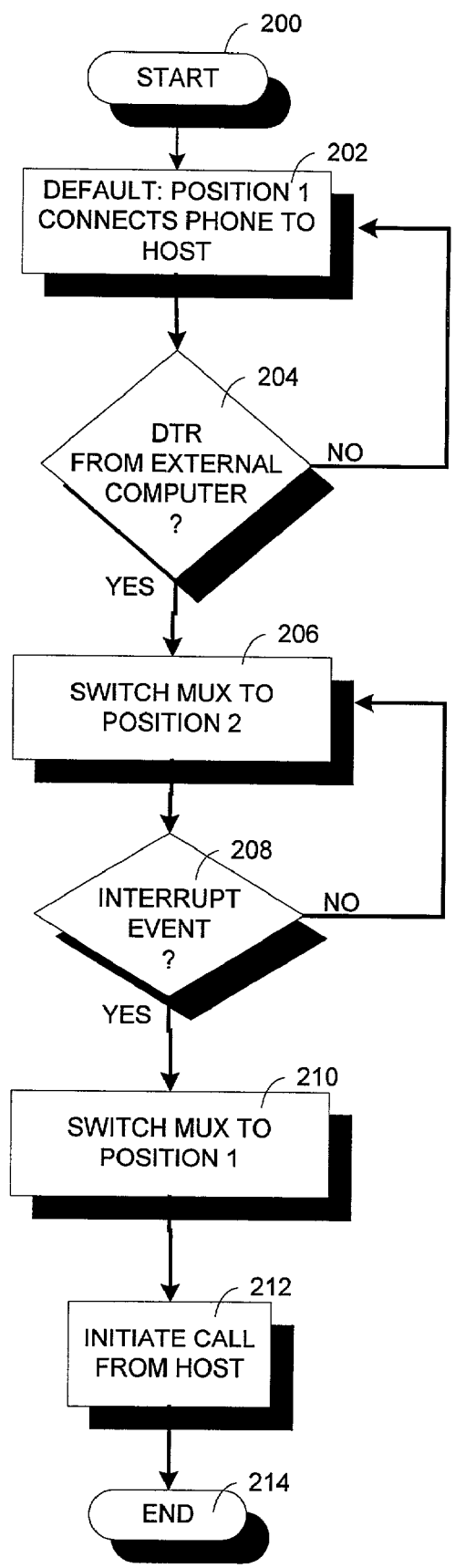
FIG. 2 is a flow diagram of a method for operating the in-vehicle information system of FIG. 1.

FIG. 2 is a flow diagram illustrating a method for operating the in-vehicle data processing system 100 of FIG. 1. In particular, the method of FIG. 2 is performed in the host computer 102 of the data processing system 100. The method begins at block 200.

At block 202, the host computer 102 places the switch 108 in a default position, position 1 as shown in the embodiment of FIG. 1. This position connects the telecommunication device 104 to the host computer 102. At block 204, the host computer 102 determines if it receives a ready control signal such as the RS-232 signal DTR from the external computer 106. If not, control returns to block 202. If the ready control signal is received, at block 206 the host computer 102 switches the multiplexer or other device forming the switch 108 to position 2. In position 2, the external computer 106 is connected for two-way communication with the telecommunication device 104.

At block 208, the host computer 102 waits for an interrupt event. The interrupt event is any event of a higher priority than the on-going communication or connection between the external computer 106 and the telecommunication device 104, particularly an event which requires use of the telecommunication device 104 by the host 102 for transmission or reception of information. An example is a detected deployment of the vehicle airbag, indicating that an emergency service provider should be contacted. Another example is actuation of the user interface 124 of the host computer 102 by a user to access data remotely using the telecommunication device 104, for example a request for driving directions.

If no interrupt event is detected, control remains in a loop including blocks 206, 208 and the host computer 102 maintains the switch 108 in position 2. If, however, an interrupt event is detected, control proceeds to block 210.

At block 210, the host computer 102 asserts the appropriate signals to the switch 108 to place the switch 108 in position 1. This interrupts the connection and any communication between the telecommunication device 104 and the external computer 106. In accordance with the RS-232 standard or other chosen data communication standard, the communication is interrupted without loss of data and by returning the telecommunication device 104 and the external computer 106 to initial states for further operation.

At block 212, with the switch in position 1, the host computer 102 initiates a call using the telecommunication device 104. The method ends at block 214.

Figure 3:
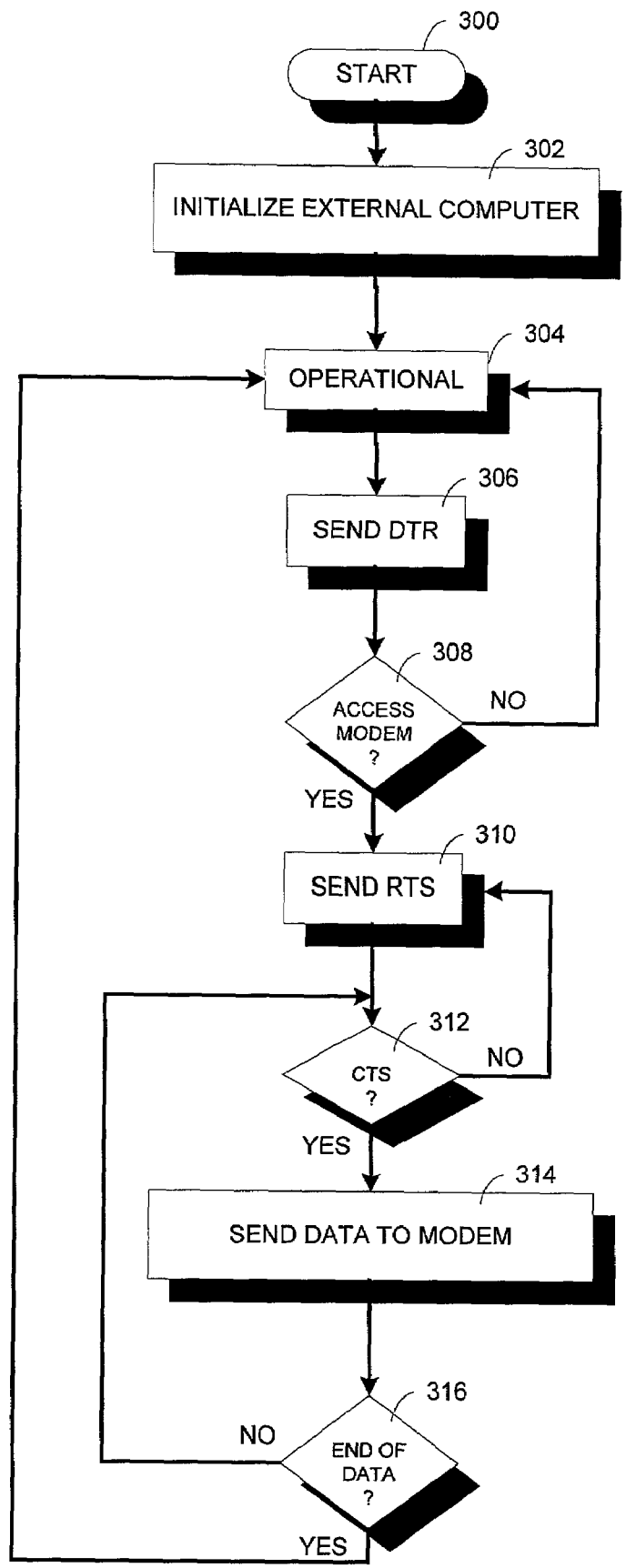
FIG. 3 is a flow diagram of a method for operating an external computer in conjunction with the in-vehicle information system of FIG. 1.

FIG. 3 is a flow diagram illustrating a method for operating an external computer 106 in conjunction with the in-vehicle data processing system 100 of FIG. 1. FIG. 3 illustrates operation of a personal computer (PC) which includes an RS-232 serial port for remote wireline data communication according to the RS-232 standard. The method begins at block 300.

At block 302, the external computer 106 is initialized. Initialization generally involves powering on the external computer 106, loading applications programs, resetting devices such as serial communications ports to initial states and entering a state awaiting user input. At block 304, the external computer 106 and its RS-232 port become operational and at block 306 the port transmits the DTR signal. This may take the form of changing the data state of the DTR signal from a negated state to an asserted state. More specifically, as defined by the RS-232 standard, this may involve switching the voltage on the wire designated as DTR from a negative voltage between −3 and −25 volts to a positive voltage between +3 and +25 volts. The DTR signal forms a ready control signal from the external computer 106 to the host computer 102.

At block 308, the external computer 106 determines if it can access the telecommunication device 104 of the data processing system 100 of FIG. 1. The external computer 106 will not be able to access the telecommunication device 104 if the host computer 102 of the data processing system does not place the switch in position 2 in response to the ready control signal, DTR. If the external computer 106 can not access the telecommunication device 104, control returns to block 304 and the external computer 106 may retry to access the telecommunication device 104 or may discontinue such attempts.

If the external computer 106 can access the telecommunication device 104, at block 310 the external computer 106 transmits the RS-232 signal RTS or Request To Send to telecommunication device 104, indicating that it has data for transmission to the telecommunication device 104. The signal RTS may be received by the host computer 102. At block 312, the external computer 106 determines if the RS-232 signal CTS or Clear To Send is received from the telecommunication device 104. If not, in a loop including block 310 and block 312, the external computer 106 continues to transmit RTS and listen for CTS. If the signal CTS is received from the telecommunication device 104, at block 314 data is sent to the telecommunication device 104 according to the RS-232 standard.

At block 316, the external computer determines if there is additional data to send or if the end of the data has been reached. If there is additional data to send, control returns to block 312 to ensure the CTS signal is received from the telecommunication device. If the host switched the switch position from position 2 to position 1, the CTS signal will no longer be present. Alternatively, the DSR or DTR signals may be used to determine status. If the end of the data has been reached, control returns to block 304. If the remote end of the connection hangs up, the signal DCD will be negated.

From the foregoing, it can be seen that the present embodiments provide a method and apparatus for prioritizing access to a shared telecommunication resource in a data processing system. The external computer is given priority when its ready control signal is detected by the host. However, if a higher priority communication must be made, the host actuates a switch to disconnect the external computer and begin communicating directly with the telecommunication resource. Communication occurs according to a predefined standard such as RS-232 so that conventional devices such as laptop PCs can be readily connected to the data processing system without modification. If connection to the external computer is interrupted, the predefined standard ensures that the devices will enter controlled states for further processing.

While a particular embodiment of the present invention has been shown and described, modifications may be made. For example, an alternative data communication standard could be substituted for the RS-232 network shown herein. Accordingly, it is therefore intended in the appended claims to cover such changes and modifications which follow in the true spirit and scope of the invention.

We claim:

1. A data processing apparatus configured for operation in conjunction with an external computer, the external computer selectively originating a ready control signal, the data processing apparatus comprising:
   a host configured to receive the ready control signal and produce a control signal in response thereto;
   a telecommunication device;
   a switch circuit which selectively couples one of the host and the external computer to the telecommunication device in response to the control signal from the host; and
   a first switch to couple one of a data output of the external computer and an output of the host with an input of the telecommunication device; and
   a second switch to couple one of an output of the host and an output of the telecommunication device with an input of the external computer.

2. The data processing system of claim 1 wherein the host is configured to:
   generate the control signal for coupling the external computer to the telecommunication device in response to receipt of the ready control signal; and
   generate the control signal for coupling the host to the telecommunication device in response to absence of the ready control signal.

3. The data processing system of claim 1 further comprising:
   a connector to detachably couple the external computer and the switch circuit.

4. The data processing system of claim 1 further comprising:
   a first host serial communication circuit to couple the host with the switch circuit and the external computer; and
   a second host serial communication circuit to couple the host with the switch circuit and the telecommunication device.

5. The data processing system of claim 1 wherein the telecommunication device comprises a radiotelephone.

6. The data processing system of claim 1 wherein the telecommunication device comprises a cellular telephone.

7. The data processing system of claim 5 wherein the telecommunication device comprises a satellite telephone.

* * * * *